United States Patent [19]
Holzrichter

[11] Patent Number: 5,999,494
[45] Date of Patent: *Dec. 7, 1999

[54] DATA RECORDER

[76] Inventor: Dieter Holzrichter, Kritenbarg 7, 22391 Hamburg, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/532,720

[22] PCT Filed: Apr. 13, 1994

[86] PCT No.: PCT/EP94/01148

§ 371 Date: Dec. 26, 1995

§ 102(e) Date: Dec. 26, 1995

[87] PCT Pub. No.: WO94/24617

PCT Pub. Date: Oct. 27, 1994

[30] Foreign Application Priority Data

Apr. 14, 1993 [DE] Germany .................. 93 05 576 U

[51] Int. Cl.$^6$ ............... G04B 21/08; G04C 21/16

[52] U.S. Cl. ............... 368/63; 368/73; 368/251

[58] Field of Search ............... 368/72–75, 63, 368/250, 251, 261, 10, 43; 340/825.44, 309.15, 309.4

[56] References Cited

U.S. PATENT DOCUMENTS

| | | | |
|---|---|---|---|
| 4,405,241 | 9/1983 | Aihara et al. | 368/63 |
| 4,459,036 | 7/1984 | Sado et al. | |
| 4,495,647 | 1/1985 | Burke et al. | 455/38 |
| 4,717,261 | 1/1988 | Kita et al. | 368/63 |
| 4,872,005 | 10/1989 | DeLuca et al. | 340/825.44 |
| 4,901,294 | 2/1990 | Aihara | 368/63 |
| 5,088,056 | 2/1992 | McIntosh et al. | 364/569 |
| 5,199,009 | 3/1993 | Svast | 368/240 |
| 5,444,673 | 8/1995 | Mathurin | 368/63 |

FOREIGN PATENT DOCUMENTS

| | | |
|---|---|---|
| 2067317 | 7/1981 | United Kingdom . |
| 2080983 | 2/1982 | United Kingdom . |

*Primary Examiner*—Vit Miska
*Attorney, Agent, or Firm*—Friedrich Kueffner

[57] ABSTRACT

A data recorder constructed in the form of a hand set (10) with an actuating mechanism function switch (14) and a time switch clock coupled to an audible signal transmitter with a time setting means, the reset key or the reset function is inhibited until after the data recall, in which each data recording is storable with a presettable time at which the audible signal transmitter is activated by means of a timing circuit, and/or wherein the data recording is individually inhibited until its recall againt an inadvertent reset so that the recorder can be employed as an appointment scheduler.

1 Claim, 1 Drawing Sheet

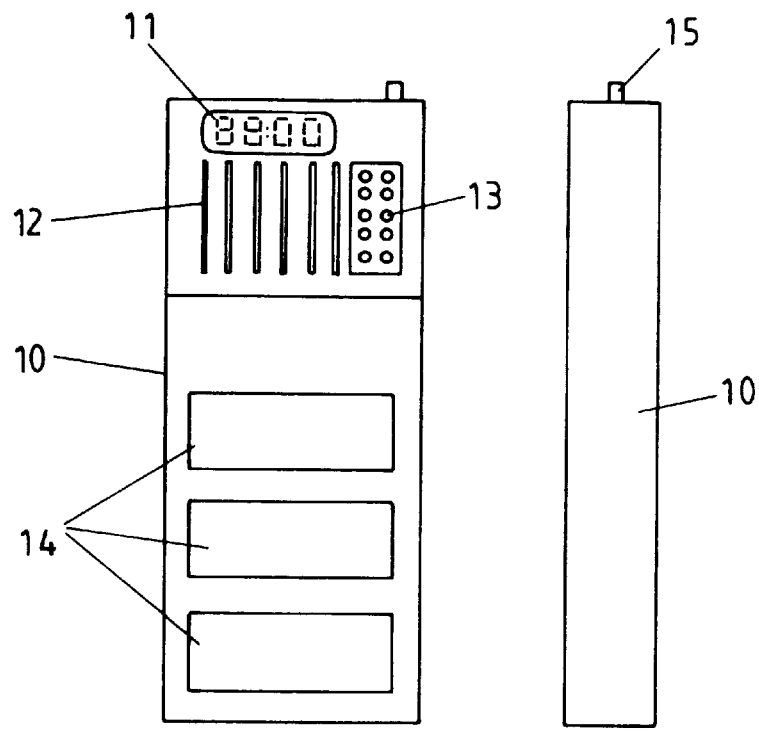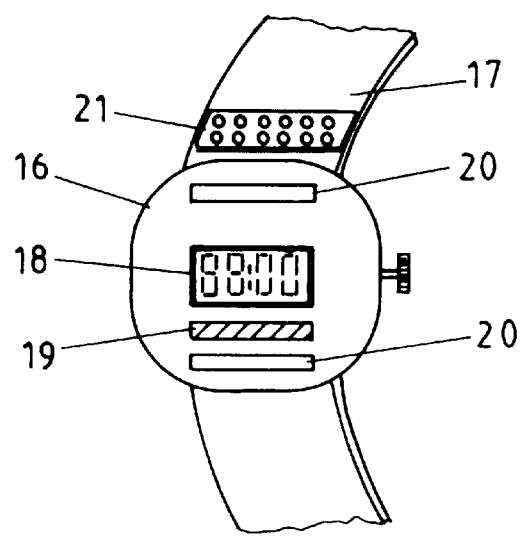

DATA RECORDER

The invention relates to a data recorder with an actuating mechanism function switch and a time switch clock coupled to an audible signal transmitter with a timing adjustment means.

BACKGROUND OF THE INVENTION

According to the DE-A-24 10 445, an alarm clock, more particularly in the form of an alarm wrist watch, is already known which, apart from the watch drive in the watch case, additionally possesses a loudspeaker which is connected to a sound generating means as well as with pertinent switching means. A diaphragm supported on the watch case serves for this, on which a coil in the form of a cylindrical ring is attached, which is surrounded by a cylindrical permamanent magnet rigidly mounted on the case. A miniaturized tape recorder with an endless tape spool or a radio receiver is provided as sound generating means.

Also known are dictating machines for magnetic tape casettes, which are designed as hand sets and which are adjustable with the aid of a sliding switch for different function sequences. According to the DE-U1-80 32 508.2, it has already been proposed to minimize this device still further so that it corresponds substantially to the magnetic tape recorder casette and the sliding switch is disposed on the narrow longitudinal side. Moreover, this device possesses a digital clock, into which a time of the day can be inputted at which a wake-up signal is triggered in the sound amplifier of the device. This wake-up signal triggers, at the same time or with a pre-set brief delay, via a further sign output of the digital clock the drive of the device for a slow forward run for the reproduction of a text recorded on the magnetic tape via the loudspeaker. In this way the dictating machine is intended to also serve as an audible notebook.

The DE-A-32 43 438 A1, too, deals with an electronic clock or watch which solves the technical problem that the emitted alarm or wake-up tones are intended to enable the user to remember a specific event. The message or note is reproduced in the form of a speech signal, which is possible by the use of digital-analog converters in conjunction with appropriate filtering circuits.

The DE-A-38 829 A1 proposes a miniaturized dictating machine combined with or integrated into the same, whose keyboard may be additionally constructed as a cordless telephone and/or computer.

The devices proposed up to now can generally be divided into two groups, the one of dictating machines and the one of clock wakeing up functions. A clock or watch emitting an alarm signal at a preset time does, however, not reveal what the wake-up signal is meant to remind of. The clock or watch according to the DE-A-32 43 438 A1 does take remedial action here, it is true, in that the alarm signal is the reproduction of a speech recording, however, this reproduction is always unsatisfactory when it takes place on an unwanted occasion, such as e.g. during lectures or conferences.

That is why it is the technical problem of the present invention to develop further or to provide a data recorder of the known type to the effect that it can be employed as an appointment scheduler.

SUMMARY OF THE INVENTION

This technical problem is resolved by means of the data recorder stated in the beginning, whose invention consists in that the reset key or the resetting fuction is inhibited until after the data recall. Only when the user of the device has actually recalled the recorded data at the preset time, is it possible to overwrite the memory afresh. This does not rule out that, particularly in the event of a misinput, the device possessesa reset key which, however, should be especially secured against an inadvertent release, irrespective of whether it is located at a secure point which is not readily accessible from outside or whether it is necessary for special key combinations having to be selected in order to trigger the reset function.

According to a further development of the invention, each data recording can be stored with a presettable time, at which the audible signal transmitter is activated by a timing circuit and/or where the data recording is individually inhibited against an inadvertent cancellation or resetting until the recall of the same. This step perfects the appointment scheduler still further to the effect that individual data recordings ca be coupled to time inputs and be recalled as such separately in a storable and recallable fashion. In this way a possibility is provided for also being able to separately cancel or change over entries in the "vocal appointment scheduler", for instance, to another time.

Audible signal transmitters are frequently subject to the shortcoming that they are annoying for persons who are present. It is true that a reduction of the volume of the audio signal minimizes the vexation, but does not solve the problem. However, an optical signal delivery at a specific time is unable to meet the object of the wake-up or alarm function since, in such a case, it would have to be presupposed that the user is looking at the data recorder at the instant when the alarm is indicated.

In order to nevertheless, in necessary additionally, provide an appointment or engagement indication to the user, it is provided according to a further construction of the invention that a display or indication means for the data which has not been recalled yet is provided. In this way the appointment message is still preserved when the advance warning time has elapsed.

In principle it is possible to fall back on all types of recording, however, with a view to a miniaturization of the device, an analog-digital converter (A/D converter) and a memory for digital signals coupled hereto is given preference. Furthermore, the device will preferably be constructed as a hand set, more particularly also operable in a mains-independent manner by means of a battery or accumulator. In order not to have to accept any losses in the operating comfort in the miniatutization of the device, provision is made for broad actuating mechanism function switch keys or slides, which substantially correspond to the thickness or the top view width of the device. If, according to a further construction of the invention, the data recording device is provided with a wrist strap and constructed in the form of an embodiment that can be carried on the wrist, it can be made possible hereby that, e.g. while driving a car, the function key or switch is actuated with the chin in order to make a data recording.

Further constructions of the invention are the subject matter of the subclaims.

BRIEF DESCRIPTION OF THE DRAWINGS

Embodiment examples of the invention are illustrated in the drawings. Thus

FIGS. 1 and 2 each show a top and a side view, respectively, of a hand set data recorder, and FIG. 3 shows a data recorder in the form of a wrist watch.

DETAILED DESCRIPTION OF THE PREFERRED EMBODIMENT

The data recorder according to the FIGS. 1 and 2 possesses a housing 10 for accommodating the voltage supply, the analog-digital converter as well as the memory and other circuits which, in principle, are known from the state of the art. By way of example, reference is made to the publications quoeted in the introductory part of the specification. In addition, the housing is provided with a digital time display in the form of a liquid crystal display. A microphone-loudspeaker combination 12 serves for the recording and reproduction. By means of a keyboard 13, discrete digits can be inputted, be it for the time preselection or—if the dictating machine is provided with a miniature computer—or for the operator input. Furthermore, keys 14 are provided, by means of which the recording, reproduction and reset functions can be set. The hand set may additionally be provided with an eyelet 15, on which e.g. a carrying strap, a chain or suchlike can be attached.

In the embodiment according to FIG. 3, the data recorder is depicted in the form of a wristwatch 16, which is fitted with a watch strap 17. The wristwatch 16 possesses a digital display 18, a loudspeaker-microphone unit as well as one or several function keys 20 which, by way of example, may also be constructed in the form of toggle switches in order to be able to effect repeated adjustments.

All devices function as detailed in the following:

When the recording key is depressed, the message can be vocally recorded on the memory. This message can be encoded, for instance, by means of keyboard 13 or 21, i.e. each data recording can be combined with the time of the day. The date recorder is not merely going to emit an alarm signal at a preset time in the manner described in the DE 32 43 438 A1, but, for example, indicate in the display that a message has to be recalled. Until this message is activated and listened to by the depression of a reproduction key, the reset function remains inhibited. The recall of the recording at the specific time reactivates the message in question about this message being due, furthermore, the inhibit function of this message is cancelled so that room is made for a new appointment. The capacity of the memory is optimally utilized hereby.

What is claimed is:

1. A data recorder comprising first means for carrying out a recording operation of data and for carrying out a recalling operation of data, second means for carrying out a deletion operation of recorded data, and operating elements for controlling the recording operation, the recalling operation and the deletion operation, a time switch clock coupled to an audible signal transmitter with a timing adjusting means, and third means for rendering an activation of the deletion operation of recorded data dependent upon an additional condition, wherein the additional condition is a previously carried out recalling operation of the data, wherein the first means is configured to be capable of carrying out a plurality of data recordings, wherein the first means comprises means for storing each data recording with a presettable time at which the audible signal transmitter is activated by a timing circuit, and wherein the second means comprises means for inhibiting inadvertent deletion of each individual data recording until after the recall operation for the individual data recording has been carried out, further comprising a digital display for non-recalled data, wherein the first means comprises an analog-digital converter connected to a microphone-loudspeaker unit and a memory for digital signals coupled to the analog-digital converter, further comprising one of a battery and an accumulator for operating the data recorder, wherein the operation elements are wide actuating mechanism function keys or sliders having a width corresponding essentially to a thickness or top view width of the data recorder, and wherein the data recorder comprises a wrist strap and is constructed so as to be adapted to be portable on a person's wrist, wherein, when a recording key is depressed, a message can be recorded on the memory, wherein the message can be encoded by a keyboard and combined with a time indication, wherein the display is configured to indicate that the message has to be recalled, wherein, until the message is activated and listened to by depressing a reproduction key, a reset function remains inhibited, and wherein the recall of the recording at a specific time reactivates the message and indicates that the message is to be recalled, and wherein the inhibiting means is configured to cancel the message for making room for a new message, so that a capacity of the memory is optimized.

* * * * *